United States Patent [19]
Kujawski

[11] Patent Number: 5,452,924
[45] Date of Patent: Sep. 26, 1995

[54] MANUALLY OPERABLE RELEASE MECHANISM FOR QUICK CONNECTOR

[75] Inventor: Rick A. Kujawski, Macomb, Mich.

[73] Assignee: Bundy Corporation, Warren, Mich.

[21] Appl. No.: 261,776

[22] Filed: Jun. 20, 1994

[51] Int. Cl.$^6$ .................. F16L 37/096; F16L 37/12; F16L 37/127
[52] U.S. Cl. .................. 285/305; 285/320; 285/308
[58] Field of Search .................. 285/305, 308, 285/320, 319, 921

[56] References Cited

U.S. PATENT DOCUMENTS

| | | | |
|---|---|---|---|
| 933,561 | 9/1909 | Herbert | 285/320 |
| 2,021,241 | 11/1935 | Mall. | |
| 2,772,898 | 12/1956 | Seeler. | |
| 2,849,215 | 8/1959 | Ardito | 285/308 |
| 3,154,327 | 10/1964 | Rothschild. | |
| 3,314,696 | 4/1967 | Ferguson et al.. | |
| 3,342,273 | 9/1967 | Crane. | |
| 3,428,340 | 2/1969 | Pelton | 285/308 |
| 3,450,424 | 6/1969 | Calisher. | |
| 3,453,005 | 7/1969 | Foults. | |
| 3,527,485 | 9/1970 | Goward et al. | 285/305 |
| 3,534,988 | 10/1970 | Lindsey. | |
| 3,538,940 | 11/1970 | Graham. | |
| 3,584,902 | 6/1971 | Vyse. | |
| 3,625,551 | 12/1971 | Branton et al.. | |
| 3,686,896 | 8/1972 | Rutter | 285/320 |
| 3,698,747 | 10/1972 | Wing et al.. | |
| 3,753,582 | 8/1973 | Graham. | |
| 4,009,896 | 3/1977 | Brewer. | |
| 4,218,979 | 8/1980 | Esposito et al.. | |
| 4,244,608 | 1/1981 | Stuemky. | |
| 4,260,184 | 4/1981 | Greenawalt et al.. | |
| 4,344,516 | 8/1982 | Kolb. | |
| 4,367,968 | 1/1983 | Ishida. | |
| 4,423,891 | 1/1984 | Menges. | |
| 4,431,218 | 2/1984 | Paul, Jr. et al.. | |
| 4,505,058 | 3/1985 | Peterson. | |
| 4,537,427 | 8/1985 | Cooke. | |
| 4,541,657 | 9/1985 | Smyth | 285/308 |
| 4,570,980 | 2/1986 | Goward. | |
| 4,572,552 | 2/1986 | Orevik et al.. | |
| 4,618,171 | 10/1986 | Fahl. | |
| 4,640,534 | 2/1987 | Hoskins et al.. | |
| 4,813,716 | 3/1989 | Lalikos et al. | 285/305 |
| 4,869,534 | 9/1989 | Ketcham et al.. | |
| 4,884,829 | 12/1989 | Funk et al.. | |
| 4,936,544 | 6/1990 | Bartholomew. | |
| 4,948,175 | 8/1990 | Bartholomew. | |
| 5,000,614 | 3/1991 | Walker et al.. | |
| 5,123,677 | 6/1992 | Krelzko et al. | 285/320 |
| 5,269,571 | 12/1993 | Haggard | 285/320 |

FOREIGN PATENT DOCUMENTS

| | | | |
|---|---|---|---|
| 1080178 | 12/1954 | France | 285/303 |
| 1294438 | 4/1962 | France | 285/305 |
| 5196185 | 8/1993 | Japan | 285/305 |
| 6050483 | 2/1994 | Japan | 285/305 |
| 398217 | 2/1966 | Switzerland | 285/305 |
| 2091365 | 7/1982 | United Kingdom | 285/305 |

Primary Examiner—Eric K. Nicholson
Attorney, Agent, or Firm—Dorn, McEachran, Jambor & Keating

[57] ABSTRACT

A quick connector coupling for forming a joint in a fluid line includes a female connector body having a bore which receives a male member. A manually operable retention clip has legs which extend through slots formed in the connector body. The legs are positioned between an upset formed on the male member and the entrance to the bore to prevent removal of the male member from the connector body. Operating tabs formed on the retention clip are manually operable to spread the legs apart a distance sufficient to permit withdrawal of the male member from the connector body.

14 Claims, 2 Drawing Sheets

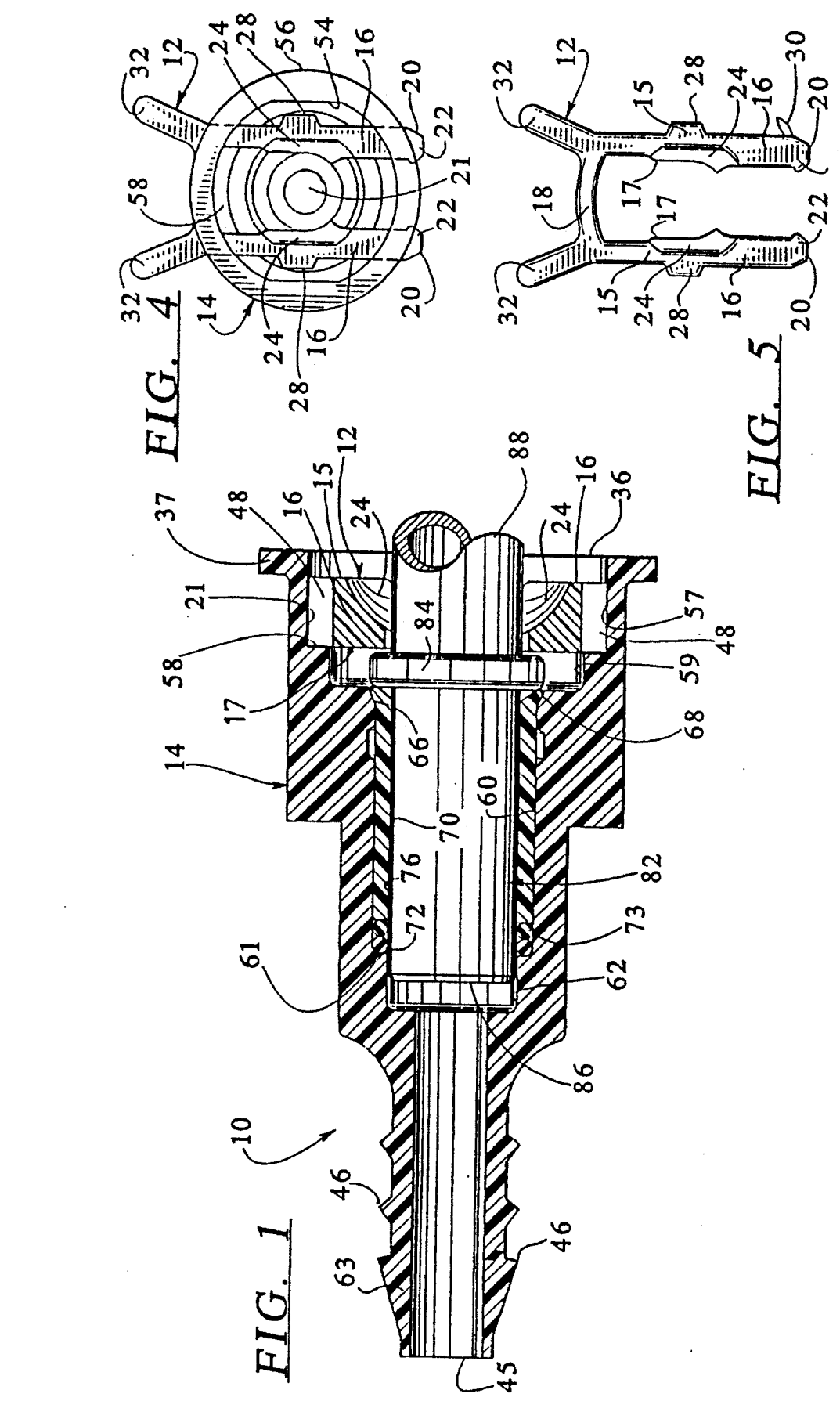

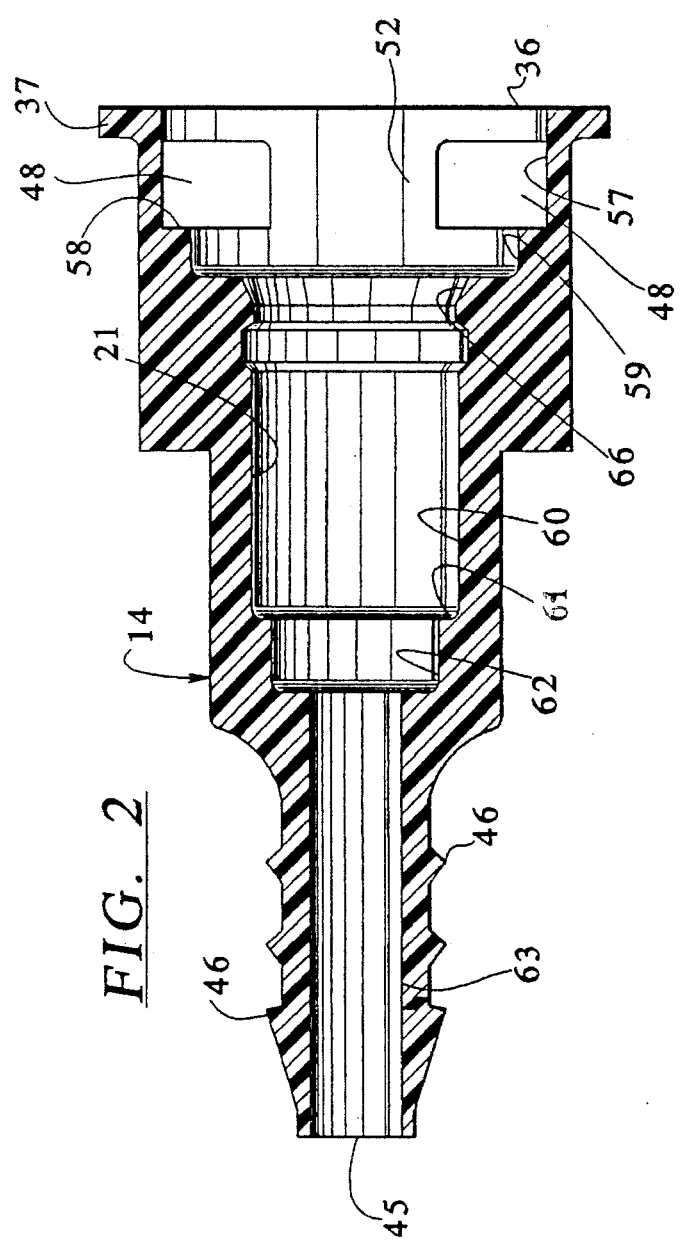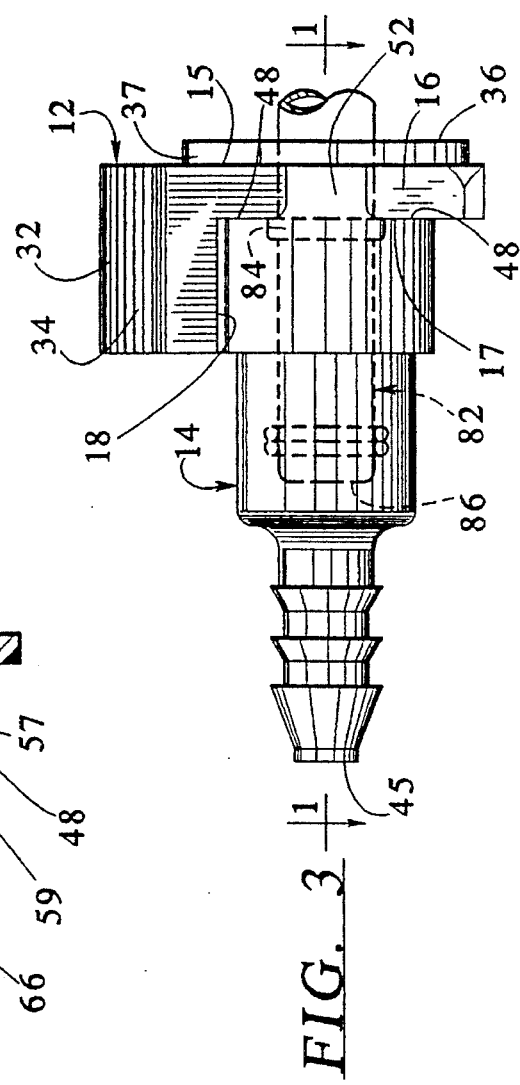

MANUALLY OPERABLE RELEASE MECHANISM FOR QUICK CONNECTOR

BACKGROUND OF THE INVENTION

This invention relates to fluid line systems which include quick connector couplings and more particularly to a manually operable release mechanism which releasably secures a male member within a female connector body.

In automotive and other fields, quick connector couplings are often utilized to provide a fluid connection between two components or conduits, thus establishing a fluid line between the two components, usually a rigid tube and a system element utilized within a metal housing. Use of quick connector couplings is advantageous in that a sufficiently sealed and secured fluid line may be established with a minimum amount of time and expense.

A number of methods and mechanisms exist for securing the male member and female connector body of a quick connector coupling together. Often, a retainer is disposed entirely within the female connector body. Typically, in this type of arrangement, the retainer includes load-bearing arms which extend radially inwardly from a radial face formed within the connector body bore. The male member is inserted into the connector body until an enlarged upset portion formed on the male member has moved fully past the retainer arms. In this position, the retainer arms extend between the enlarged upset and the connector body radial face, preventing withdrawal of the male member.

This retainer arrangement is very reliable and quite adequate for many quick connector applications. Several drawbacks exist, however, which may make the arrangement inadequate for other applications. A special release tool or sleeve is generally required to disconnect the joint. Furthermore, it is often difficult to accurately determine whether a proper fluid connection has been established.

In another retention arrangement, a removable retention clip is inserted through slots formed in the exterior of the female connector body. Legs extending through the slots are disposed between the upset portion of the male member and the entrance to the connector body, thereby preventing disconnection of the coupling. Due to the general physical appearance of such clips, they are sometimes referred to as "hairpin" retainers or clips. Retention clips of this general type are illustrated in U.S. Pat. Nos. 5,000,614, 4,869,534 and 4,423,892.

Known retention clips have also been deficient in some aspects. Notably, special release tools or sleeves have still been required to effect disconnection of the joint.

A need exists for a retention clip which is easily and manually removable from the connector body without requiring use of special tools or sleeves. The retention clip of the present invention meets this need.

SUMMARY OF THE INVENTION

The present invention provides a quick connector coupling for forming a joint in a fluid line system. The coupling includes a female connector body having an axial bore extending from an entrance. A plurality of slots are spaced about the circumference of the connector body.

The coupling further includes a male member formed at an end of a rigid tube. The male member has an enlarged upset and is received within the bore of the female connector body.

A manually operable retention clip extends through the slots of the connector body. The retention clip includes a pair of elongated legs extending through the slots from a cross member. The legs are positioned between the upset of the male member and the entrance to the connector body and are spaced from each other a distance less than the diameter of the upset of the male member. In this manner, the male member is secured within the female connector body.

The retention clip further includes operating tabs manually operable to spread the legs apart a distance exceeding the diameter of the upset of the male member so that the male member may be withdrawn from the female connector body.

BRIEF DESCRIPTION OF THE DRAWINGS

FIG. 1 is a partial sectional view, taken through lines 1—1 of FIG. 3, of a quick connector coupling according to the present invention;

FIG. 2 is a sectional view of a female connector housing according to the present invention;

FIG. 3 is a side elevation view of a quick connector coupling according to the present invention;

FIG. 4 is a front elevation view of a retention clip installed in the connector housing of FIG. 2; and FIG. 5 is a front elevation view of the retention clip of FIGS. 1, 3 and 4.

DESCRIPTION OF THE PREFERRED EMBODIMENTS

A quick connector coupling formed in a fluid line system is designated as 10 in FIG. 1. Quick connector coupling 10 is comprised of a female connector body 14 and a male member 82 formed at an end of a tube 88 which forms a part of a fluid line system. In use, connector body 14 is, in turn, connected to flexible tubing (not shown) which is also a component of the fluid line system. Female connector body 14 and male member 82 are connectable to form a permanent, but severable, joint.

Female connector body 14, illustrated alone in FIG. 2, is preferably composed of a plastic material, such as nylon-12. It is hollow and defines an axial bore 21. Bore 21 extends through connector body 14 from an entrance 36 to an open end 45, defining several stepped bore portions of increasingly smaller diameter. A radial, annular rim 37 formed in the exterior of connector body 14 surrounds entrance 36.

The largest diameter portion of bore 21 is adjacent entrance 36 and defines retention clip portion 57. Four slots 48 are equidistantly spaced about the circumference of retention clip portion 57. Slots 48 extend axially from rim 37 towards open end 45 of connector body 14. Support members 52 separate slots 48 from each other and also connect rim 37 to the rest of connector body 14. Support members 52 have curved exterior surfaces 56 and planar interior surfaces 54 (see FIG. 4).

Bore 21 narrows at a step 58 to define upset housing portion 59. Seal assembly housing portion 60 follows upset housing portion 59 and is of further reduced diameter. A conical shoulder 66 is formed between housing portions 59 and 60. Bore 21 narrows again at a shoulder 61 to define tube end receptacle portion 62.

The smallest diameter portion of bore 21 defines tubing connection portion 63. Tubing connection portion 63 follows tube end receptacle portion 62 and terminates at open end 45 of connector body 14. Ramped barbs 46 are formed in the exterior of tubing connection portion 63 to facilitate connection to flexible tubing. Open end 45 provides communication with the flexible tubing. Connection portion 63 could be configured in alternative ways for connection to other system arrangements. For example, threads could be formed in its outer periphery to facilitate connection within a threaded bore of a housing containing a system component.

Male member 82 is received within female connector body 14 and includes an enlarged upset 84 spaced a given distance from end 86 of male member 82. When properly connected, upset 84 is disposed within upset housing portion 59 of connector body 14. Cylindrical sealing surface 76 extends between upset 84 and end 86. Male member 82 is typically formed at the end of a rigid, metal tube 88.

Seated within seal assembly housing portion 60 are "O" ring seals 72 and 73, and hollow spacer 70. "O" rings 72 and 73 are secured in connector body 14 between spacer 70 and shoulder 61. Spacer 70 fits tightly within the seal assembly housing portion 60 of bore 21 and has a conically enlarged end 68 which seats against the complementary conical shoulder 66. Spacer 70 serves the dual purposes of regulating the axial compression of "O" rings 72 and 73, and of providing an abutment surface which helps to limit the extent to which male member 82 may penetrate female body 14.

"O" rings 72 and 73 are preferably composed of fluorosilicone, fluorocarbon rubber or toughened fluorosilicone. Spacer 70 is preferably composed of a plastic such as nylon-12.

A flexible retention clip 12 (FIGS. 3-5) is positioned in slots 48 and extends through retention clip portion 57 of connector body 14. Retention clip 12 is made of a resilient, flexible material, such as plastic.

Clip 12 includes a pair of elongated, generally parallel legs 16 extending from, and joined at one end by, a cross member 18. Legs 16 have an axial width approximately equal to, but a little less than, the axial width of slots 48. Cross member 18 separates legs 16 by a distance approximately equal to the diameter of male member 82. The axial width of cross member 18 is substantially greater than the axial width of legs 16. As seen in FIG. 3, cross member 18 is axially aligned with front side 15 of each leg 16 adjacent rim 37, but extends axially beyond rear side 17 of each leg 16 remote from rim 37. Cross-member 18 is formed with an arcuate cross section (see FIG. 5) to provide enhanced flexibility.

Inwardly extending hooks 22 are formed in the interior side of the end 20 of each leg 16 remote from cross member 18. When properly connected, legs 16 extend into bore 21 through a first pair of adjacent slots 48. Cross member 18 is disposed outside of connector body 14 immediately adjacent the support member 52 joining the first pair of adjacent slots. Ends 20 of legs 16 extend out of connector body 14 through a second pair of adjacent slots 48. Hooks 22 engage the exterior surface of the support member 52 separating the second pair of adjacent slots, locking retention clip 12 onto connector body 14.

A sloped guide surface 24 is formed on the interior of each leg 16 intermediate hook 22 and cross member 18. Guide surfaces 24 slope radially inwardly and axially away from front side 15 of each leg 16 and terminate approximately midway between the front and rear sides. Rear sides 17 of legs 16 do not have guide surfaces. A radially enlarged portion 28 is formed on the exterior of each leg 16 opposite from guide surfaces 24.

A catch 30 is formed on the exterior of one of the legs 16 just above hook 22. Catch 30 extends away from leg 16 and hook 22 at approximately a forty-five degree angle.

Operating tabs 32 are formed on cross member 18 of retention 12 directly opposite from legs 16. Tabs 32 project above cross member 18 at a slight outward angle relative to legs 16. The axial width of operating tabs 32 is equal to the axial width of cross member 18. A series of gripping ridges 34 (FIG. 3) is formed on the exterior surface of each tab 32 to assist an operator in gripping and squeezing tabs 32.

Prior to insertion of male member 82, the seal elements and retention clip 12 are installed in connector body 14. "O" ring seals 72 and 73 are simply dropped into connector body bore 21, where they will come to rest against shoulder 61. Insertion of spacer 70 into bore 21, such that its conically enlarged end 68 seats against concical shoulder 66 of bore 21, retains the "O" ring seals in the bore.

Retention clip 12 is installed by inserting legs 16 through a first pair of adjacent slots 48 formed in connector body 14. Generally, any two adjacent slots may be utilized. Clip 12 should be oriented such that sides 15 and guide surfaces 24 of legs 16 face entrance 36 of connector body 14.

Passage of leg 16 through slots 48 is facilitated by application of inwardly-directed pressure to operating tabs 32. Typically, the operator grips the ridged portions 34 of tabs 32 with a thumb and a finger and applies a "squeeze". Application of such force deforms cross member 18 from an arcuate condition towards a planar condition. This deformation, in turn, spreads legs 16 apart from each other. A squeeze sufficient to allow hooks 22 to clear the support member 52 separating the first pair of slots 48 should be applied. The resilient nature of cross member 18 restores retention clip 12 to its original, or nondeformed, state when inward pressure on operating tabs 32 ceases.

Retention clip 12 is moved through connector body 14 until the hooked ends of legs 16 pass through the second pair of adjacent slots 48. Hooks 22 engage the exterior surface of the support member 52 separating the second pair of slots 48, locking clip 12 in place.

Once clip 12 is locked onto connector body 14, catch 30 resists its removal. To remove clip 12, tabs 32 must be squeezed to spread legs 16 and disengage hooks 22 from support member 52. Spreading legs 16, however, causes catch 30 to hook, or latch onto, the edge of the adjacent side support member 52 (the support member adjacent radially enlarged portion 28 of leg 16). Further withdrawal of clip 12 is prevented. Removal of retention clip 12 is possible if sufficient force is applied to cause catch 30 to shear, or break off of leg 16. It should be noted that catch 30, due to the angle at which it is oriented, resists withdrawal of clip 12 from connector body 14 but does not hinder installation of clip 12.

After retention clip 12 is installed, quick connector coupling 10 is connected by inserting male member 82 into bore 21 of female connector body 14. Sealing surface 76 of male member 82 pases between retention clip legs 16 and into seal assembly housing portion 60 of bore 21 with little or no resistance, as the spacing of legs 16 is approximately equal to the diameter of member 82.

Resistance to insertion of male member 82 occurs when upset 84 reaches retention clip legs 16. Guide surfaces 24 permit passage of upset 84 by legs 16 upon application of sufficient force. As upset 84 passes between legs 16, it rides along guide surfaces 24, steadily flexing legs 16 outwardly. Once upset 84 has fully passed, legs 16 spring back into place behind upset 84, preventing withdrawal of male member 82 from connector body 14.

The reduction in diameter of bore 21, as well as the presence of spacer 70, prevent further inward insertion of male member 82. Thus, upset 84 is "trapped" in upset housing portion 59 of connector body 14. "O" rings 72 and 73 form a fluid seal between sealing surface 76 of male member 82 and the interior of seal assembly housing portion 60 of connector body 14.

Operating tabs 32 are utilized to release male member 32 from connector body 14. Tabs 32 are manually squeezed to spread legs 16 apart. Force is applied to tabs 32 until legs 16 are spread apart a distance sufficient to allow passage of male member 82 therebetween. Male member 82 may then be withdrawn from connector body 14, effecting a disconnection of the joint.

Various features of the present invention have been explained with reference to the embodiments shown and described. It must be understood, however, that modification may be made without departing from the spirit and scope of the invention.

I claim:

1. A quick connector coupling for forming a joint in a fluid line system comprising:

a female connector body defining an axial bore extending from an entrance, a plurality of slots being spaced about the circumference of said connector body;

a male member formed at an end of a tube, said male member having an enlarged upset and being received within said bore of said female connector body; and a manually operable retention clip extending through said slots of said female connector body, said retention clip including a pair of elongated legs extending through said slots from a first side of a cross member, said legs being positioned between said upset of said male member and said entrance to said connector body and being spaced from each other a distance less than the diameter of said upset of said male member such that said male member is secured in said female connector body, said clip further including operating tabs manually operable to spread said legs apart a distance exceeding the diameter of said upset of said male member such that said male member may be withdrawn from said female connector body, said operating tabs being formed on a second side of said cross member opposite said legs and extending away from said cross member.

2. A quick connector coupling as recited in claim 1 wherein support members spaced about the circumference of said connector body separate said slots.

3. A quick connector coupling as recited in claim 2 wherein a hook is formed on an end of each of said legs remote from said cross member, said hooks extending through two of said slots and engaging said support member separating said two slots to lock said retention clip onto said connector body.

4. A quick connector coupling as recited in claim 1 wherein a series of gripping ridges are formed on each of said operating tabs to assist in manual operation.

5. A quick connector coupling as recited in claim 1 wherein said operating tabs extend away from said cross member at an angle relative to said legs.

6. A quick connector coupling as recited in claim 5 wherein said cross member has an arcuate cross section.

7. A quick connector coupling as recited in claim 6 wherein said legs become spaced further from each other when said operating tabs are pressed closer to each other.

8. A quick connector coupling as recited in claim 7 wherein the axial width of said cross member and of said operating tabs is substantially greater than the axial width of said legs.

9. A quick connector coupling as recited in claim 1 wherein a sloped guide surface is formed on a side of each said leg of said retention clip facing said entrance to said bore of said connector body, said guide surfaces permitting passage of said upset of said male member by said legs in one direction.

10. A quick connector coupling as recited in claim 1 wherein an angled catch is formed on one of said legs, said catch being engageable with one of said support members to resist removal of said retention clip from said connector body.

11. A quick connector coupling as recited in claim 1, wherein a cylindrical sealing surface is defined on said male member, and seals are disposed in said bore of said female connector body, said sealing surface contacting said seals to establish a fluid seal between said male member and said female connector body.

12. A quick connector coupling as recited in claim 11 wherein said seals comprise two "O" ring seals, said "O" ring seals being retained in said bore between a radial shoulder formed in said bore and a hollow, cylindrical spacer.

13. A quick connector coupling as recited in claim 1 wherein said operating tabs extend away from said cross member at positions directly opposite said legs, such that said retention clip has an "H" shape.

14. A quick connector coupling as recited in claim 1 wherein said retention clip is plastic.

* * * * *